United States Patent
Anderson et al.

(10) Patent No.: US 7,272,788 B2
(45) Date of Patent: Sep. 18, 2007

(54) CLIENT-SERVER SYSTEM FOR MERGING OF METADATA WITH IMAGES

(75) Inventors: Eric C. Anderson, San Jose, CA (US); John Bernstein, San Jose, CA (US); Robert Paul Morris, Raleigh, NC (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 791 days.

(21) Appl. No.: 09/796,179

(22) Filed: Feb. 27, 2001

(65) Prior Publication Data

US 2002/0087601 A1 Jul. 4, 2002

(51) Int. Cl.
*G06F 17/00* (2006.01)

(52) U.S. Cl. .................. 715/515; 715/507; 709/201; 709/219; 707/104.1

(58) Field of Classification Search .......... 715/515, 715/513, 505–508, 838; 709/201, 219; 345/838; 382/283; 358/403, 1.15; 707/102, 707/104.1

See application file for complete search history.

(56) References Cited

U.S. PATENT DOCUMENTS

| | | | | |
|---|---|---|---|---|
| 4,513,373 A * | 4/1985 | Sheets | ..................... | 709/236 |
| 5,226,120 A | 7/1993 | Brown et al. | ............... | 709/224 |
| 5,249,230 A | 9/1993 | Mihm | ....................... | 380/249 |
| 5,396,546 A | 3/1995 | Remillard et al. | ....... | 379/93.24 |
| 5,430,827 A | 7/1995 | Rissanen | ................... | 704/272 |
| 5,477,264 A | 12/1995 | Sarbadhikari et al. | ... | 348/231.6 |
| 5,490,252 A | 2/1996 | Macera et al. | ............. | 709/249 |
| 5,493,677 A * | 2/1996 | Balogh et al. | ........... | 707/104.1 |
| 5,513,373 A | 4/1996 | Damkier | ...................... | 710/16 |
| 5,552,776 A | 9/1996 | Wade et al. | ................ | 340/5.74 |
| 5,606,365 A | 2/1997 | Maurinus et al. | ........ | 348/222.1 |
| 5,684,918 A | 11/1997 | Abecassis | .................... | 386/83 |
| 5,737,491 A * | 4/1998 | Allen et al. | ................. | 704/270 |
| 5,805,215 A * | 9/1998 | Mizoguchi | .............. | 348/231.5 |
| 5,806,005 A | 9/1998 | Hull et al. | .................. | 455/566 |
| 5,838,926 A | 11/1998 | Yamagishi | .................. | 709/249 |

(Continued)

FOREIGN PATENT DOCUMENTS

EP 0930770 7/1999

(Continued)

OTHER PUBLICATIONS

Shutterfly.com, "pages from Shutterfly.com web site, downloaded from http://web.archive.org/web/20001015204906/www.shutterfly.com/index.jsp, and /home/sign_in.jsp", Mar. 2, 2000.*

(Continued)

*Primary Examiner*—Doug Hutton
*Assistant Examiner*—James H Blackwell

(57) ABSTRACT

A method and system for merging metadata with digital images is disclosed, where the digital images are stored as image files having metadata fields associated therewith. The method and system include receiving data uploaded from a remote location, providing a web application to a client device over a network when requested, and transmitting the previously uploaded data to the web application. When an image requires input of metadata on the client device, the uploaded data is displayed on the client device for selection by the user. In response to the user's selection, the selected data is then used to automatically populate the metadata fields associated with the image file.

29 Claims, 6 Drawing Sheets

U.S. PATENT DOCUMENTS

| | | | | |
|---|---|---|---|---|
| 5,845,265 | A | 12/1998 | Woolston | 705/37 |
| 5,905,736 | A | 5/1999 | Ronen et al. | 370/546 |
| 5,926,624 | A * | 7/1999 | Katz et al. | 709/217 |
| 5,973,731 | A | 10/1999 | Schwab | 348/161 |
| 5,987,525 | A * | 11/1999 | Roberts et al. | 709/248 |
| 5,991,806 | A | 11/1999 | McHann | 709/224 |
| 5,999,968 | A | 12/1999 | Tsuda | 709/213 |
| 6,006,039 | A | 12/1999 | Steinberg et al. | 396/57 |
| 6,009,410 | A * | 12/1999 | LeMole et al. | 705/14 |
| 6,012,088 | A | 1/2000 | Li et al. | 709/219 |
| 6,017,157 | A | 1/2000 | Garfinkle et al. | 396/639 |
| 6,035,323 | A * | 3/2000 | Narayen et al. | 709/201 |
| 6,064,671 | A | 5/2000 | Killian | 370/389 |
| 6,067,571 | A * | 5/2000 | Igarashi et al. | 709/232 |
| 6,069,648 | A | 5/2000 | Suso et al. | 348/14.02 |
| 6,073,241 | A | 6/2000 | Rosenberg et al. | 726/3 |
| 6,085,195 | A * | 7/2000 | Hoyt et al. | 707/10 |
| 6,119,135 | A * | 9/2000 | Helfman | 715/513 |
| 6,147,742 | A | 11/2000 | Bell et al. | 355/27 |
| 6,151,609 | A * | 11/2000 | Truong | 715/505 |
| 6,166,729 | A | 12/2000 | Acosta et al. | 715/719 |
| 6,167,469 | A * | 12/2000 | Safai et al. | 710/62 |
| 6,185,551 | B1 | 2/2001 | Birrell et al. | 707/3 |
| 6,185,611 | B1 | 2/2001 | Waldo et al. | 709/221 |
| 6,202,061 | B1 * | 3/2001 | Khosla et al. | 707/3 |
| 6,223,190 | B1 | 4/2001 | Aihara et al. | 715/513 |
| 6,226,752 | B1 | 5/2001 | Gupta et al. | 726/9 |
| 6,269,481 | B1 | 7/2001 | Perlman et al. | 717/178 |
| 6,301,586 | B1 | 10/2001 | Yang et al. | 707/104.1 |
| 6,337,712 | B1 | 1/2002 | Shiota | 348/231.1 |
| 6,374,260 | B1 * | 4/2002 | Hoffert et al. | 707/104.1 |
| 6,408,332 | B1 * | 6/2002 | Matsumoto et al. | 709/219 |
| 6,453,361 | B1 * | 9/2002 | Morris | 709/250 |
| 6,502,195 | B1 | 12/2002 | Colvin | 726/18 |
| 6,523,046 | B2 * | 2/2003 | Liu et al. | 707/104.1 |
| 6,525,749 | B1 * | 2/2003 | Moran et al. | 715/863 |
| 6,529,522 | B1 | 3/2003 | Ito et al. | 370/466 |
| 6,567,122 | B1 * | 5/2003 | Anderson et al. | 348/211.3 |
| 6,573,927 | B2 | 6/2003 | Parulski et al. | 348/32 |
| 6,581,094 | B1 | 6/2003 | Gao | 709/220 |
| 6,583,799 | B1 * | 6/2003 | Manolis et al. | 715/838 |
| 6,587,596 | B1 * | 7/2003 | Haeberli | 382/283 |
| 6,608,973 | B2 | 8/2003 | Masera | 396/429 |
| 6,623,528 | B1 | 9/2003 | Squilla | 715/523 |
| 6,628,325 | B1 | 9/2003 | Steinberg et al. | 348/211.1 |
| 6,629,104 | B1 * | 9/2003 | Parulski et al. | 707/102 |
| 6,633,317 | B2 * | 10/2003 | Li et al. | 715/854 |
| 6,636,259 | B1 * | 10/2003 | Anderson et al. | 348/211.3 |
| 6,647,409 | B1 | 11/2003 | Sherman et al. | 709/203 |
| 6,650,831 | B1 | 11/2003 | Thompson | 396/6 |
| 6,657,702 | B1 | 12/2003 | Chui et al. | 355/40 |
| 6,704,777 | B2 * | 3/2004 | Matsumoto et al. | 709/219 |
| 6,707,531 | B2 * | 3/2004 | Crasnianski et al. | 355/49 |
| 6,714,969 | B1 * | 3/2004 | Klein et al. | 709/219 |
| 6,715,003 | B1 | 3/2004 | Safai et al. | 710/33 |
| 6,732,162 | B1 * | 5/2004 | Wood et al. | 709/219 |
| 6,732,331 | B1 * | 5/2004 | Alexander | 715/513 |
| 6,757,684 | B2 * | 6/2004 | Svendsen et al. | 707/10 |
| 6,762,860 | B1 * | 7/2004 | Watanabe et al. | 358/403 |
| 6,784,924 | B2 | 8/2004 | Ward et al. | 348/207.1 |
| 6,877,134 | B1 * | 4/2005 | Fuller et al. | 715/500.1 |
| 6,883,146 | B2 * | 4/2005 | Prabhu et al. | 715/854 |
| 6,888,569 | B2 * | 5/2005 | Fox et al. | 348/239 |
| 6,924,827 | B1 * | 8/2005 | Gulati et al. | 715/763 |
| 6,930,709 | B1 * | 8/2005 | Creamer et al. | 348/211.3 |
| 7,007,243 | B2 * | 2/2006 | Baldino | 715/853 |
| 7,010,144 | B1 * | 3/2006 | Davis et al. | 382/100 |
| 7,197,531 | B2 | 3/2007 | Anderson | 709/203 |
| 2002/0054224 | A1 | 5/2002 | Wasula et al. | 348/231.6 |
| 2002/0069070 | A1 * | 6/2002 | Boys et al. | 704/275 |
| 2002/0088000 | A1 * | 7/2002 | Morris | 725/105 |
| 2004/0046868 | A1 | 3/2004 | Anderson et al. | 348/207.11 |
| 2004/0174440 | A1 | 9/2004 | Kojima et al. | 348/222.1 |
| 2004/0221244 | A1 * | 11/2004 | Baldino | 715/835 |
| 2005/0052685 | A1 * | 3/2005 | Herf et al. | 358/1.15 |
| 2006/0041591 | A1 * | 2/2006 | Rhoads | 707/104.1 |

FOREIGN PATENT DOCUMENTS

| | | |
|---|---|---|
| WO | WO99/021336 | 4/1999 |
| WO | WO99/048276 | 9/1999 |

OTHER PUBLICATIONS

Schumacker, The Axis 2100 Network Camera: It's A Video Camera. It's A Web Server. It Runs Linux!, Sep. 2000, 4 pages.*

Tesic,"Metadata Practices for Consumer Photos", 2005, IEEE, pp. 86092.*

Davis et al,"MMM2: Mobile Media Metadata for Media Sharing", 2005,ACM, 4 pages.*

MerlinOne,"Merlin Digital Archive", copyright unknown, downloaded from http://merlinone.com, 4 pages.*

Kuchinsky et al., "FotoFile: A Consumer Multimedia Organization and Retrieval System", HP Labs, CHI '99 Pittsburgh, PA.*

Smith et al,"Inquiry With IMagery: Historical Archive Retrieval With Digital Camera", 1999, ACM, pp. 405-408.*

Davis, M.,"Mobile Media Metadata: Metadata Creation System for Mobile IMages", Oct. 10-16, 2004, ACM, 2 pages.*

Arnold et al.,"Content-Based Image Retrieval at the End of the Early Years", 2000, IEEE, pp. 1349-1380.*

Wilhelm et al.,"Photo Annotation On A Camera Phone", Apr. 24-29, 2004, ACM, pp. 1403-1406.*

Toyama et al,"Geographic Location Tags on Digital Images", Nov. 2-8, 2003, ACM, 10 pages.*

Pan, L., "A Digital Camera With A Function Of Picture Transmission," Database EPODOC, European Patent Office, XP001091526 [TW 403853B (Inventec Corp) Sep. 1, 2000].

JP 09233543 (Canon Inc.) Sep. 5, 1997 (abstract) [online] Retrieved from the PAJ database.

JP 10105517 (Takasaki) Apr. 24, 1998 (abstract) [online] Retrieved from the PAJ database.

JP 2000047988 (Tozono) Jul. 28, 1998 (abstract) [online] Retrieved from the PAJ database.

* cited by examiner

CLIENT-SERVER SYSTEM FOR MERGING OF METADATA WITH IMAGES

FIELD OF INVENTION

The present invention relates to manipulating digital images over the Internet, and more particularly to providing an architecture for associating metadata with digital images on client devices.

BACKGROUND

One advantage of digital cameras over film based cameras is that digital cameras have the ability to associate metadata with a captured image that may later be accessed by a viewer. For example, once the digital image has been transferred from the digital camera to a PC and displayed, a user may also view information about the image, such as date and time of capture, the name of the image, and image size, for instance. Metadata may be either stored with the image or stored separately in a separate database. If the metadata is stored with the image, then the metadata is typically stored as tags within the image file of the captured image.

For example, a standards organization referred to as the Digital Imaging Group (DIG) has developed a DIG35 Metadata Specification that provides a set of metadata definitions to the imaging industry. The DIG35 metadata specification for describing elements of an image is independent of the imaging application or the image file format used.

By associating metadata with digital images, every image that is uploaded to the Internet and shared with others around the globe may be its own stand-alone catalog record that can be used by each recipient for a variety of purposes.

Businesses, professionals and consumers can all utilize metadata in order to manage images. One example use of metadata is professional photographers associating information about camera settings, copyright information and image manipulation techniques within the image in order to recreate images and document their work. Additionally, metadata enables consumers to share their captured experiences by using metadata to tell the story or narration behind their images. For example, users may use image-editing software on their PC to add explanatory captions to each photo from their vacation, and then upload those photos to a photosharing website. Assuming the photo website was DIG35 compatible, the photo website would understand and save all the captions. Friends and family may then access the photo website and not only see the pictures, but read and/or hear the story and history behind each image by accessing the metadata.

The assignee of the present application has developed an operating system for digital cameras that generates digital image files that include metadata. Some of the metadata is populated automatically by the camera upon image capture with data describing various attributes of the image and the camera. Other metadata may be manually entered by the user, such as image names, categories and captions. Still other metadata may be populated by software programs that run on the camera.

Although these methods effectively populate the metadata, they have disadvantages. The disadvantage with populating the metadata manually is that the user must retype the information for each image. When providing information for large numbers of images, manually entering the data for each image is extremely tedious and time-consuming for the user, especially when the images share many of the same characteristics. This problem can be alleviated by running a program on the camera that automatically populates the metadata with the desired data. However, if the user uses a different camera and doesn't have the program handy, the user must resort to the manual method.

Accordingly, what is needed is an improved method and system for merging metadata with images. The present invention addresses such a need.

SUMMARY OF THE INVENTION

The present invention provides a method and system for merging metadata with digital images, where the digital images are stored as image files having metadata fields associated therewith. The method and system include receiving data uploaded from a remote location to a web server, providing a web application to a client device over a network when requested, and transmitting the previously uploaded data to the web application. When an image requires input of metadata on the client device, the uploaded data is displayed on the client device for selection by the user. In response to the user's selection, the selected data is then used to automatically populate the metadata fields associated with the image file.

According to the present invention, the need for cumbersome data entry on the client device is significantly minimized, especially where the user needs to supply metadata for a series of images that have similar content.

DETAILED DESCRIPTION OF THE INVENTION

The present invention relates to an online digital imaging architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention provides a meta-application architecture for allowing photo-service websites to receive and send images to and from a wide range of client device types, and for integrating the services of the photo-service sites 14 for access by users of the client devices. The present invention also allows client devices to access a variety of web applications and to automatically allow the web applications to populate the image files on the client devices with metadata.

Figure 1:
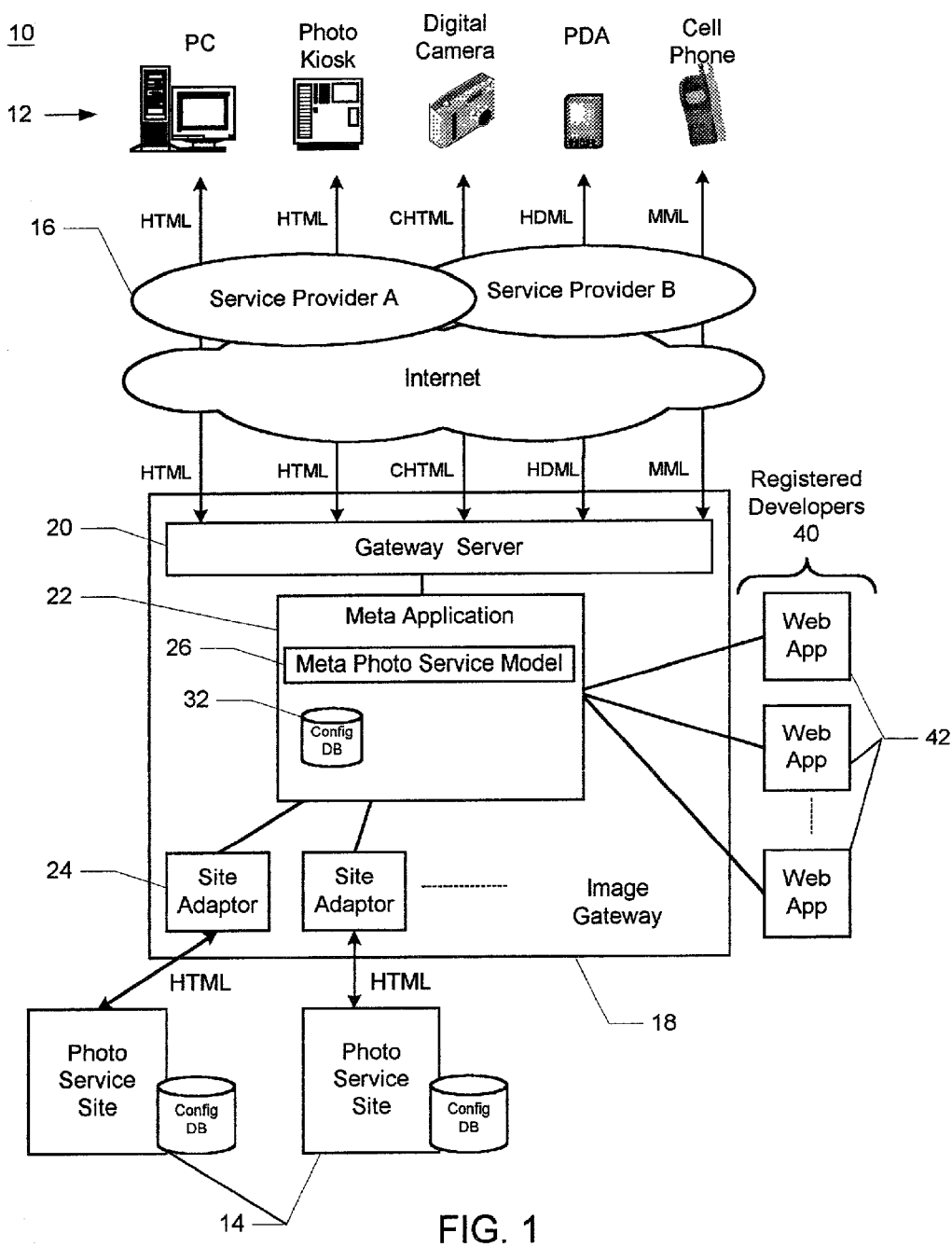
FIG. 1 is a block diagram illustrating a meta-application architecture for an online system in accordance with a preferred embodiment of the present invention.

FIG. 1 is a block diagram illustrating a meta-application architecture for an online system 10 in accordance with a preferred embodiment of the present invention. The system 10 includes multiple client devices 12 that request imaging services from multiple online photo-service sites 14. The photo-service sites 14 are sites on the Internet that provide different types of digital imaging services. For example, one photo-service site 14 may provide an image hosting service, while another photo-service site 14 provides image printing services, for instance.

A client device 12 refers to an electronic device capable of capturing and/or displaying digital images and communicating over a network, such as the Internet. Such electronic devices include devices that store digital images, such as PCs and photo kiosks, and image capture devices such as digital cameras and PDAs, and cellphones that have lens attachments, for example. In a preferred embodiment, the client devices 12 are browser-based, although non-browser-based devices may also be supported. The client devices 12 communicate over the Internet via a wireless, or wired connection, but because they incorporate different browser types, client devices 12 communicate data in different formats. For example, some client devices 12 such as PCs may communicate data in HTML format. Other client devices 12 such as cellphones, may use data formats such as Wireless Markup Language (WML), which is a streamlined version of HTML for small screen displays, cHTML which is a subset of HTML, and Handheld Device Markup Language (HDML), for instance.

In one embodiment, the client devices 12 connect to the Internet via a service provider 16, which may include a wireless carrier and/or an Internet service provider (ISP). Once connected to the Internet, the client devices 12 have the capability of uploading the digital images to the online photo-service sites 14 for storage and/or for receiving digital images from the photo-service sites 14 for display.

One aspect of the present invention provides a meta-application 22 architecture that provides a common communication framework for integrating photo-service sites 14 and services for client devices 12. The meta-application architecture includes a site on the Internet, referred to as the image gateway 18, that interfaces between the client devices 12 and the photo-service sites 14. In a preferred embodiment, the image gateway 18 includes a gateway server 20, a software meta-application 22, and a set of site adapter software 24 that provide a set of standard APIs and data formats that the photo-service sites 14 use so that the image gateway 18 can present data and services from the sites 14 to the various client devices 12. These same APIs and data formats allow the image gateway 18 to present the services of multiple photo-services 14 in one integrated application, and allow communication among the photo-services sites 14. For example, the image gateway 18 enables a user with images stored on one photo-host site to access to the services of all print service providers who also use the image gateway 18. The photo-hosting site 14 would not need to make any special effort in order to work with the print service providers since they are all bound together by the meta-application.

The gateway server 20 performs the function of a web server, while the meta-application 22 performs the function of an application server. The meta-application 22 may reside on the same or different computer from the gateway server 20, and one of the photo-service sites may be part of the image gateway 18. The gateway server 20 provides client device 12 connectivity and is primarily responsible for detecting the client device 12 type and its browser type and display characteristics. The gateway server 20 may also provide security, configuration, and administration services, including the collection of usage statistics.

In a preferred embodiment, the gateway server 20 passes the data and service requests of the client devices 12 to and from the meta-application 22 in a device independent fashion.

One reason that there is no standard for communication between photoservice sites 14 is because each photo-service site 14 represents its own data and services in different formats. For example, all photo-hosting web sites 14 organize a user's images in a nested tree-like structure similar to a file directory, but the names of the nodes in these trees vary across sites. For instance, some of the terms used include "album," "pholio," "page," and "shelves".

According to another aspect of the present invention, the meta-application 22 abstracts the underlying data model and the function provided by the photo-service sites 14, which is common across the photo-service sites 14, to define a common data model format for the data, referred to here as a meta photo-service model 26. In a preferred embodiment, the meta photo-service model 26 is implemented using XML.

Since each photo-service site 14 may use its own data model and define its own API or protocol for accessing the site's functionality, respective site adapters 24 are used to convert between the data and service formats of each photo-service site 14 and the meta photo-service model 26.

In a preferred embodiment, the image gateway 18 is provided with a database 32 for supporting the aggregation of data and services across the various photo-service sites 14. This enables the image gateway 18 to support a single login for a particular client device 12 and enables data sharing, such as billing information, across photo-service sites 14. This data sharing eliminates the need for users to reenter this information for each site, but requires that the database 32 be synchronized with the data stored on the photo serving sites.

According to a further aspect of the present invention, registered developers 40 who have registered with the image gateway 18 may post web applications 42 on the image gateway 18 for access by the client devices 12. In a preferred embodiment, the web applications 42 are imaging related and allow the users of the client devices 12 to manipulate their images and metadata associated with those images. Examples of such imaging-related web applications 42 that may be provided include an upload image application that uploads images from the client device 12 to a photo-hosting service 14 via the image gateway 18, and a search application that searches for the user's images, for instance. The web applications 42 may reside on servers external to the image gateway 18 or they may reside within the image gateway 18.

It should be noted that although the term images as used herein includes media types such as still images, burst images; and time lapse images, the term images also encompasses media types such as movies, sound annotations, animations, and clip art, for instance.

In a preferred environment, the web applications 42 are implemented as server-side processes that allow web pages to interact with databases and other applications. Examples of such server-side processes include active server pages (ASPs), CGI scripts and JavaServer Pages (JSPs), which are web pages that contain HTML and embedded programming code that is executed by a server. When a web browser makes a request from the web application 42 for a web page, the server executes the embedded program, and the HTML provides the page layout that will be returned to the web browser. The programming code provides the processing for the page, such as delivering search data entered on a web page to the database for lookup. It would also format the results of that search as HTML and send it back to the client device 12 for display.

Once communication between the client device 12 and the image gateway 18 has been established, the client device displays a web page from the gateway server 20 indicating what web applications 42 are available to a user. In a preferred environment, the available web applications 42 are displayed via hyperlinks. For example, the web page displayed to the user may display links such as "Upload Images," and "Search For Images," which link to corresponding web applications 42.

In response to the user selecting a web application, the gateway server 20 connects the client device with the selected web application 42. Those with ordinary skill in the art will appreciate that the connection is preferably established with a secure handshake mechanism.

As noted above, most of the web applications 42 deal with capturing images and manipulating metadata associated with those images. Consider for example a web application 42 that assist a user in making a corporate directory. When run on a client device 12, such as a digital camera, the web application 42 would prompt the camera user to take pictures of all the employees in the company.

Figure 2:
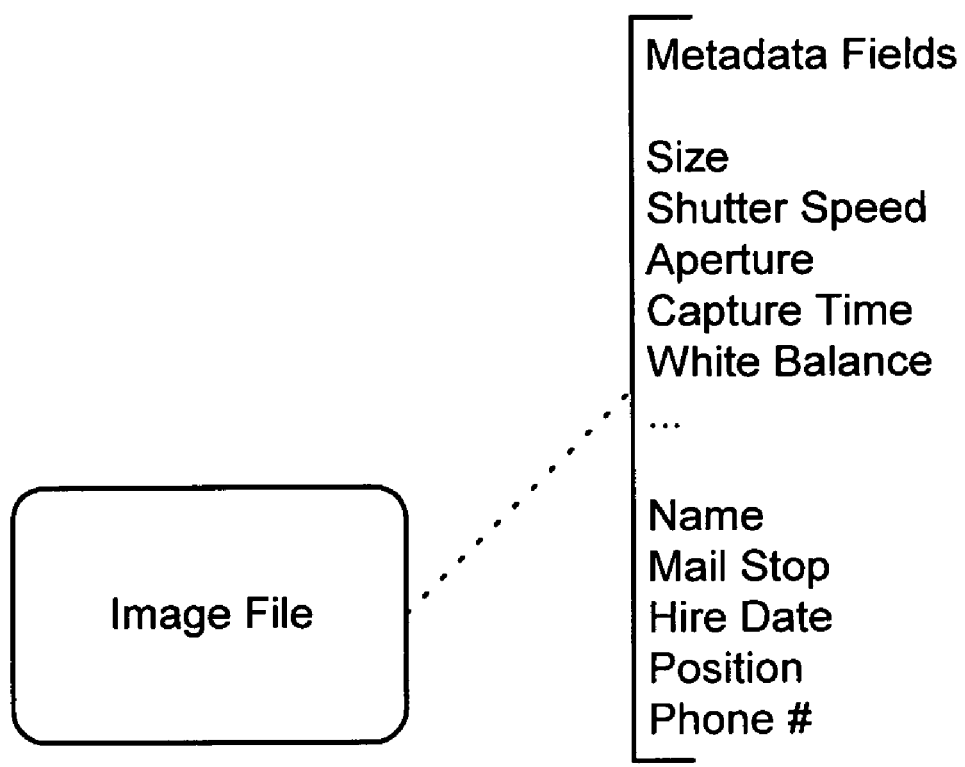
FIG. 2 shows example metadata elements associated with an image file for a corporate directory application, in which a user provides, for each image file, the appropriate information to populate fields corresponding to each of the metadata elements.

FIG. 2 shows example metadata fields associated with an image file for a corporate directory application, the user would then provide for each image file the appropriate information to populate the metadata fields. The metadata fields may include both standard data regarding the captured image and specialized data pertaining to the application. For the corporate directory application, the metadata fields pertaining to the directory application might include the employee's name, mail stop, hire date, position, phone number, and so on.

Requiring that the user manually enter all of the employee information for each employee would be tedious and time consuming. A further aspect of the present invention provides a client-server approach for merging metadata with the images.

Figure 3:
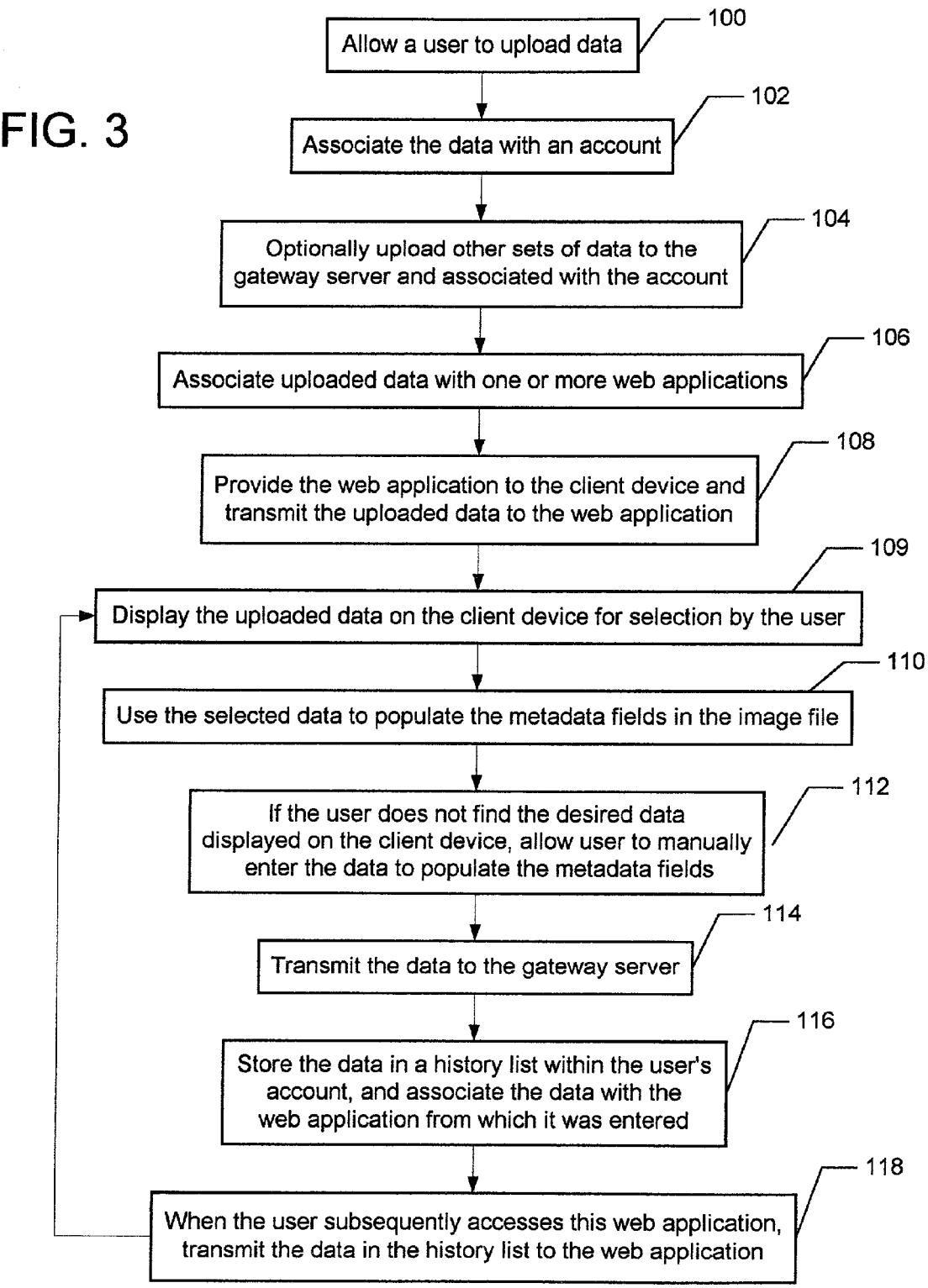
FIG. 3 is a flow chart illustrating a process for merging metadata with digital images in accordance with one preferred embodiment of the present invention.

FIG. 3 is a flow chart illustrating a process for merging metadata with digital images in accordance with one preferred embodiment of the present invention. The process begins by allowing a user to upload data to the gateway server 20 in step 100, and associating the data with an account in step 102. The user may upload the data from a conventional computer, the client device, or any other source, and the account may represent a user account or a corporate account.

Figure 4:
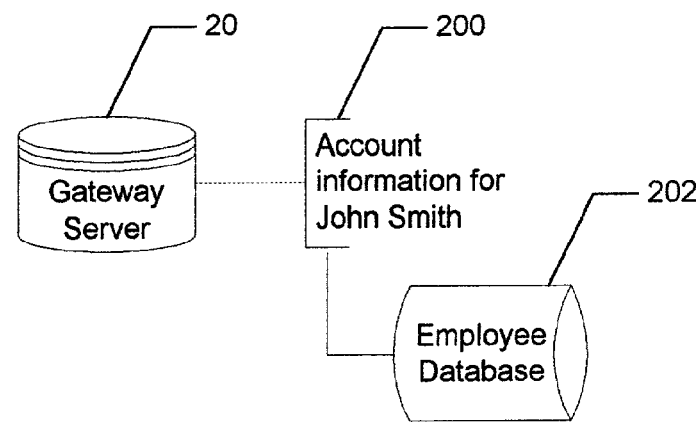
FIG. 4 is a diagram showing the data that a user may upload in a corporate directory example.

FIG. 4 is a diagram showing the data that a user may upload in the corporate directory example. Assume that a user, John Smith, is responsible for creating the corporate directory using the corporate directory web application. The data that John would upload to the gateway server 20 may be an employee database 202 listing all employees and their employee information. Once uploaded, the employee database 202 would be stored and associated with John Smith's account 200.

Figure 5:
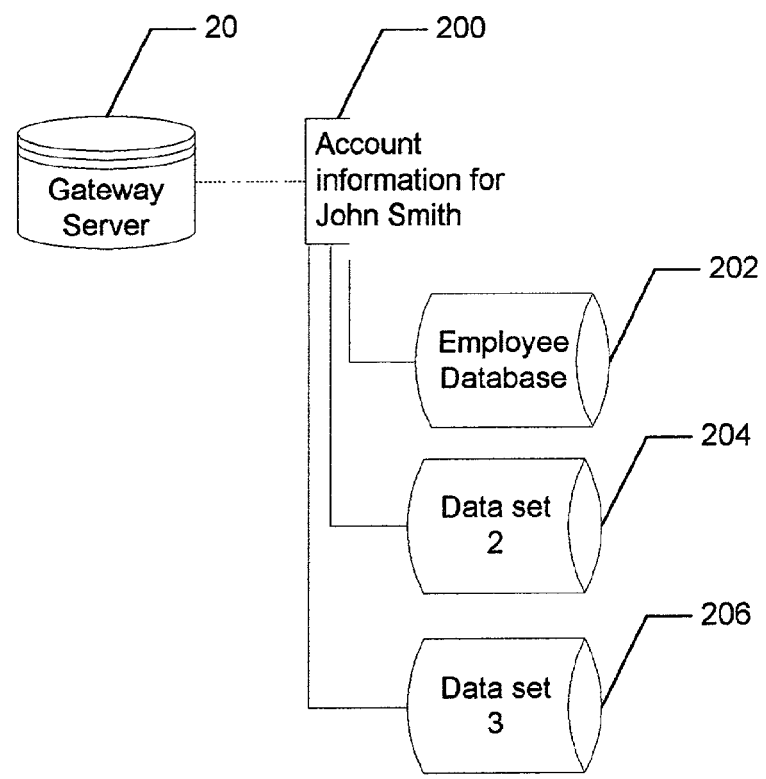
FIG. 5 is a block diagram illustrating two additional data sets that have been uploaded and associated with John Smith's account.

Referring again to FIG. 3, other sets of data may also be optionally uploaded to the gateway server 20 and associated with the account in step 104. FIG. 5 is a block diagram illustrating two additional data sets 204 and 206 that have been uploaded and associated with John Smith's account 200.

Figure 6:
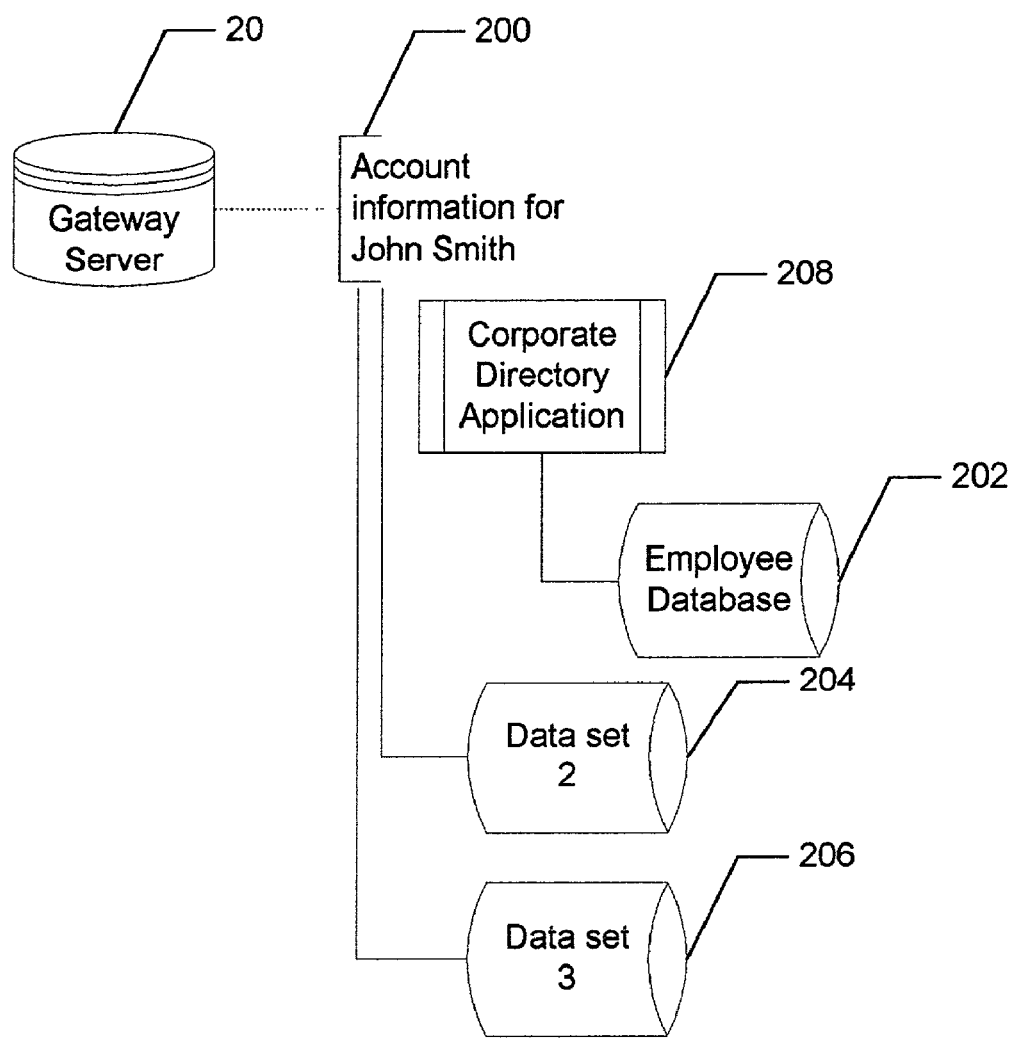
FIG. 6 is a block diagram illustrating that the Employee database that is associated with John Smith's account could be further associated with a "Corporate Directory" web application.

Referring again to FIG. 3, the uploaded data that is associated with the account may be further associated with one or more web applications 42 in step 106. FIG. 6 is a block diagram illustrating that the Employee database 202 that is associated with John Smith's account 200 could be further associated with a "Corporate Directory" web application 208.

Referring again to FIG. 3, the gateway server 20 provides the web application 42 to the client device when requested and transmits the previously uploaded data associated with the web application 42 in step 108. The previously uploaded data is sent to the device in a format compatible with the display characteristics of the client device 12. In one embodiment, the uploaded data could specified using XML and the server would apply XSL stylesheets depending on the device type. The server could have a standard set of stylesheets to apply or custom stylesheets could be provided when the data is initially uploaded to the server. When an image requires the input of metadata, the data transmitted to client device 12 is displayed for selection by the user in step 109. In response to the user's selection, the web application 42 uses the selected data to automatically populate the metadata fields associated with the image file in step 110.

In the corporate directory application example, the user would choose to open either the employee database 202 or the data sets 204 and 206. If the user selects the employee database 202, then a list of employee names would be displayed, allowing the user to select the appropriate employee's name. The employee information for the employee would then be used to populate the corresponding metadata fields in the employee's image file.

Figure 7:
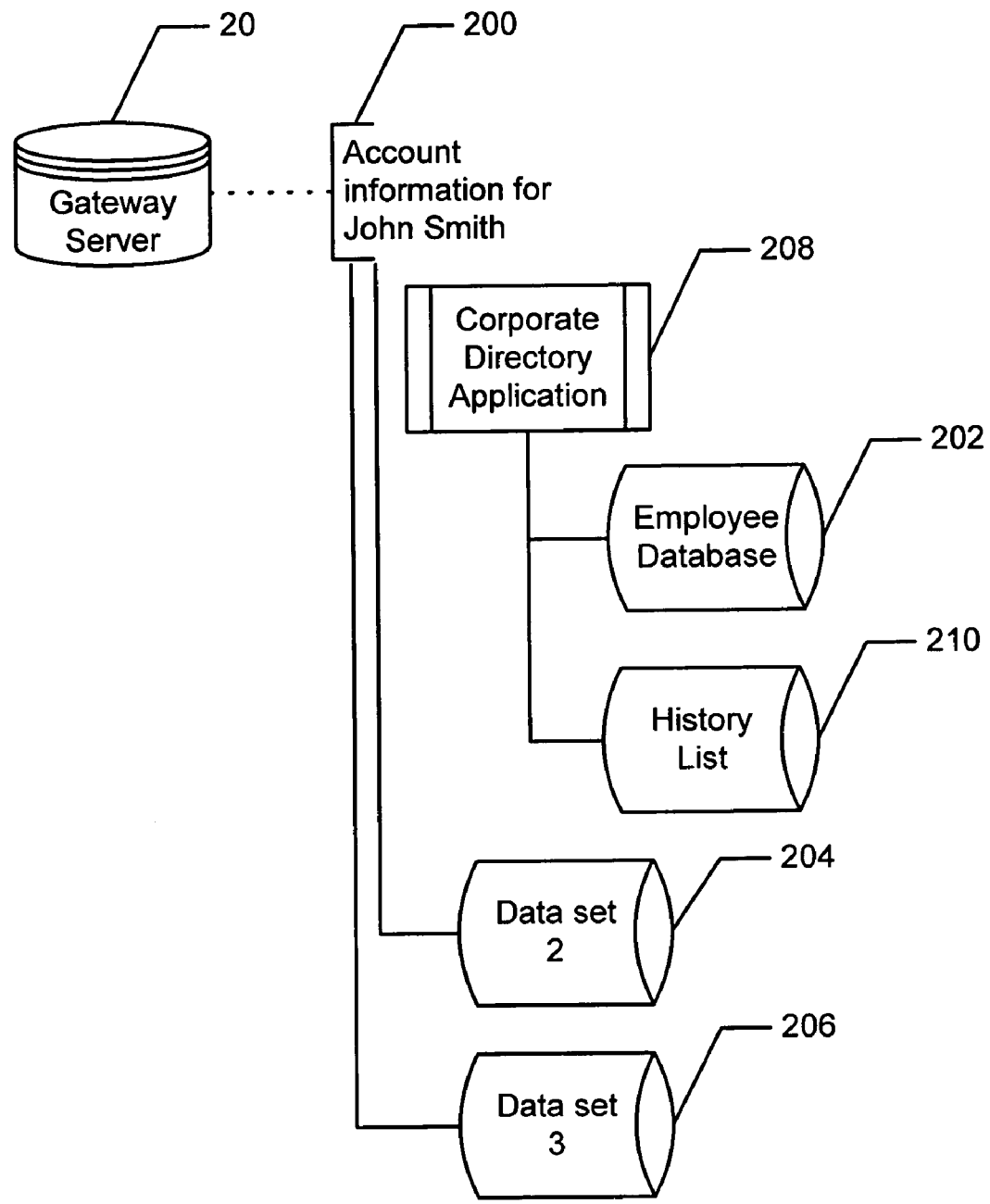
FIG. 7 is a block diagram illustrating a history list associated with the user's account and a web application.

If the user does not find the desired data displayed on the client device 12, the user manually enters the data to populate the metadata fields in step 112. Once this data is entered into the client device 12, it is then transmitted to the gateway server 20 in step 114. As shown in FIG. 7, the gateway server 20 may store this data in a history list 210 within the user's account and associate the history list 210 with the web application 42 from which it was entered in step 116. The history list may also be associated with a specific metadata field within the web application 42. Referring again to FIG. 3, when the user accesses this web application 42 in the future, the gateway server 20 will transmit the data in the history list to the web application 42 in step 118, thus saving the user from having to manually enter the data again.

According to the present invention, the need for cumbersome data entry on the client device 12 is significantly minimized since all the data needed for the image is stored on the gateway sever 20, associated with the user's account, associated with a specific web application, and then transmitted to the camera when the data is needed.

According to yet a further aspect of the present invention, XML and XSL (i.e., XML stylesheets) are used to enable a user to attach metadata to any image and associate one or more XSL stylesheets to the metadata. For example, an insurance agent could take a picture or an auto accident and submit it to the gateway server 20 with metadata that is specific to his/her own company's use of that data. When the image and/or its metadata are accessed, the gateway server 20 uses the stylesheets associated with metadata along with information about the presentation characteristics of the client device 12 to present the metadata in a manner that is consistent with the semantics and meaning of the metadata. That is, the gateway server 20 could present a form or report depending on the request from the user.

The gateway server 20 would not need to understand the meaning or the format of the metadata. In fact, each image could have its own unique set of XML tags that are used to specify its metadata. Each image in this case would have its own stylesheet or set of stylesheets that the gateway server 20 uses to customize the display of the metadata based on the display device and the request. In a preferred embodiment, however, standard sets of XML tags are provided for use with images depending on the web application 42 that the gateway server 20 supports, instead of defining different XML tags for each image.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for merging metadata with an image file, wherein the image file is stored on an image capture device having a metadata field associated therewith, the method comprising:

providing access to a server including a web application operable to populate a metadata field of an image file stored on the image capture device with metadata;

receiving at the image capture device a web page from the web application, wherein the web page includes data uploaded to the server and the data is suitable to populate the metadata field as metadata;

when the image file stored on the image capture device requires input of metadata within the metadata field, using a web browser to display the web page at the image capture device for selection from among the data by a user; and in response to the user's selection, using the web application to automatically populate the metadata field of the image file stored on the image capture device with the selected data.

2. The method of claim 1, further including associating the uploaded data and the web application with an account.

3. The method of claim 2, further including associating the uploaded data with the web application.

4. The method of claim 3, wherein the data from the server was previously uploaded to the server from the image capture device.

5. The method of claim 4, further including receiving, at the image capture device, a data set, the data set comprising additional data that can be selected by the user to populate the metadata field of the image file stored on the image capture device.

6. The method of claim 4, further including:

allowing the user to manually enter data an the image capture device to populate the metadata field of the image file stored on the image capture device;

transmitting the manually entered data from the image capture device to the server;

associating the manually entered data with the web application at the server; and when the user subsequently accesses the web application on the image capture device, transmitting the manually entered data associated with the web application from the server to the image capture device for selection by the user to populate a metadata field of an image file stored on the image capture device, thereby saving the user from having to manually re-enter the previously manually entered data.

7. The method of claim 6, further including storing the manually entered data in a history list within a user account.

8. The method of claim 7, further including associating the history list with a specific metadata field within the web application.

9. The method of claim 4, further including using XML tags to attach metadata to an image file and associating one or more XSL stylesheets to the attached metadata.

10. The method of claim 9, further including using the one or more XSL stylesheets associated with the attached metadata and a presentation characteristic of the image capture device to present the attached metadata in a manner that is consistent with the semantics and meaning of the attached metadata.

11. The method of claim 1, wherein providing access to a web application includes sending the web page from the server to the image capture device when requested by the image capture device.

12. The method of claim 1, wherein the data is received at the image capture device and uploaded to the server separate from the image file being stored on the image capture device.

13. A system for merging metadata with an image file, wherein the image file is stored on an image capture device having a metadata field associated therewith, the system comprising:

means for providing access to a web application operable to populate a metadata field of an image file stored on the image capture device with metadata;

means for receiving at the image capture device a web page from the web application, wherein the web page includes data uploaded to a server and the data is suitable to populate the metadata field with metadata;

means for displaying the web page at the image capture device for selection from among the data by a user when the image file stored on the image capture device requires input of metadata within the metadata field; and means for using the web application to automatically populate the metadata field of the image file stored on the image capture device with the selected data.

14. The system of claim 13, further comprising means for associating the uploaded data and the web application with an account.

15. The system of claim 14, further comprising means for associating the uploaded data with the web application.

16. The system of claim 15, wherein the data from the server was previously uploaded to the server from the image capture device.

17. The system of claim 16, further comprising means for receiving, at the image capture device, a data set, the data set comprising additional predetermined information that can be selected by the user to populate the metadata field of the image file stored on the image capture device.

18. The system of claim 17, further comprising means for associating the history list with a specific metadata field within the web application.

19. The system of claim 16, further including:
means for allowing the user to manually enter data on the image capture device to populate the metadata field of the image file stored on the image capture device;
means for transmitting the manually entered data from the image capture device to the server;
means for associating the manually entered data with the web application at the server; and
means for transmitting the manually entered data associated with the web application from the server to the image capture device for selection by the user to populate a metadata field of an image file stored on the image capture device, thereby saving the user from having to manually re-enter the previously manually entered data, wherein the manually entered data associated with the web application is transmitted when the user subsequently accesses the web application on the image capture device.

20. The system of claim 19, further comprising means for storing the manually entered data in a history list within a user account.

21. The system of claim 16, further comprising means for using an XML tags to attach metadata to an image file and associate one or more XSL stylesheets to the attached metadata.

22. The system of claim 21, wherein the one or more XSL stylesheets associated with the attached metadata are used along with a presentation characteristic of the image capture device to present the attached metadata in a manner that is consistent with the semantics and meaning of the attached metadata.

23. The system of claim 13, wherein means for providing access to a web application includes means for sending the web page from the server to the image capture device when requested by the image capture device.

24. The system of claim 13, wherein the system is configured such that the data is received at the image capture device and uploaded to the server separate from the image file being stored on the image capture device.

25. An online system comprising:
an image capture device having one or more image files stored thereon, wherein each of the one or more image files has one or more metadata fields associated therewith;
a server in communication with the image capture device over a network, the server for supplying a web application to the image capture device and further for storing previously uploaded data associated with an account, the web application associated with the account and operable to populate the one or more metadata fields of the one or more image files with metadata, wherein the uploaded data is suitable to populate the one or more metadata field as metadata; and
a browser running on the image capture device, the browser for interacting with the web application such that when the web application identifies the account to the server, the server transmits a web page including the previously uploaded data to the image capture device so that the web page may be displayed at the image capture device using the browser for selection from among the data by the user to populate the one or more metadata fields of the one or more image files;
wherein in response to the user's selection, the web application automatically populates the one or more metadata fields of the one or more image files with the selected previously uploaded data.

26. The online system of claim 25, wherein the web application performs an imaging related function on the one or more image files.

27. The online system of claim 25 wherein the data from the server was previously uploaded to the server from the image capture device.

28. The online system of claim 25, including a plurality of image capture devices that communicate data in different formats, and a plurality of online photo service sites, wherein each of the plurality of online photo service sites utilizes a different data model, the server further including:
a meta-application for defining a common data model format for the different formats of the plurality of online photo service sites such that when a request is received from an image capture device for a photo from a particular photo service site, the request is passed to the photo service site, and wherein when a response from the photo service site is received, the response is converted from the data model of the photo service site to the common data model format, the converted request is then presented to the requesting image capture device in the data format required by the requesting image capture device.

29. The online system of claim 25, wherein the server is configured to store the uploaded data and to transmit the uploaded data to the image capture device in the web page via the web application separate from the one or more files being stored on the image capture device.

* * * * *

UNITED STATES PATENT AND TRADEMARK OFFICE
CERTIFICATE OF CORRECTION

PATENT NO. : 7,272,788 B2 Page 1 of 1
APPLICATION NO. : 09/796179
DATED : September 18, 2007
INVENTOR(S) : Eric Anderson It is certified that error appears in the above-identified patent and that said Letters Patent is hereby corrected as shown below:

Column 7, line 62, the word "an" should read --on--

Column 9, line 23, the phrase, "an XML tags" should read --XML tags--

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,272,788 B2 | Page 1 of 1 |
| APPLICATION NO. | : 09/796179 | |
| DATED | : September 18, 2007 | |
| INVENTOR(S) | : Anderson et al. | |

It is certified that error appears in the above-identified patent and that said Letters Patent is hereby corrected as shown below:

Title page, item (56), under "Other Publications", in Column 2, Line 1, delete "web site," and insert -- website, --.

Page 2, item (56), under "Other Publications", in Column 2, Line 1, delete "Schumacker," and insert -- Schumaker, --.

Page 2, item (56), under "Other Publications", in Column 2, Line 11, delete "IMagery:" and insert -- Imagery: --.

Page 2, item (56), under "Other Publications", in Column 2, Line 14, delete "IMages"," and insert -- Images", --.

Column 10, line 22, in Claim 27, delete "claim 25" and insert -- claim 25, --.

Signed and Sealed this
Seventeenth Day of April, 2012

David J. Kappos
*Director of the United States Patent and Trademark Office*